Sept. 2, 1958 J. BEIER 2,849,885
FRICTION TRANSMISSION IN TWO RANGES
Filed Nov. 30, 1954 11 Sheets-Sheet 1

INVENTOR
Josef Beier
BY
Michael S. Striker
ATTORNEY

Sept. 2, 1958 J. BEIER 2,849,885
FRICTION TRANSMISSION IN TWO RANGES
Filed Nov. 30, 1954 11 Sheets-Sheet 2

Inventor:
Josef Beier
BY:
Michael S. Striker

Sept. 2, 1958  J. BEIER  2,849,885
FRICTION TRANSMISSION IN TWO RANGES
Filed Nov. 30, 1954  11 Sheets-Sheet 3

Inventor:
Josef Beier
BY:
Michael S. Striker
agt.

Sept. 2, 1958                    J. BEIER                     2,849,885
                      FRICTION TRANSMISSION IN TWO RANGES
Filed Nov. 30, 1954                                     11 Sheets-Sheet 4
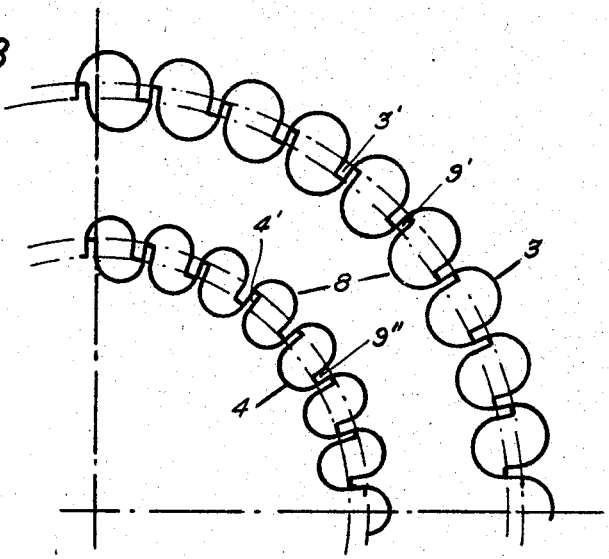
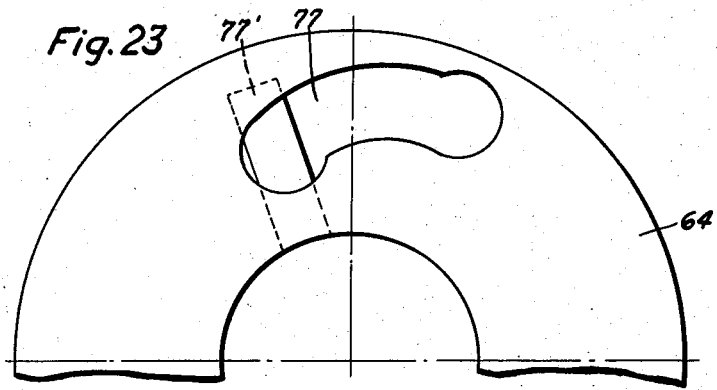
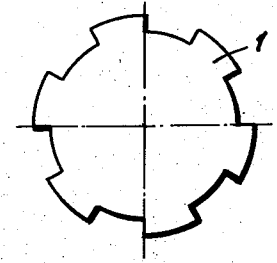
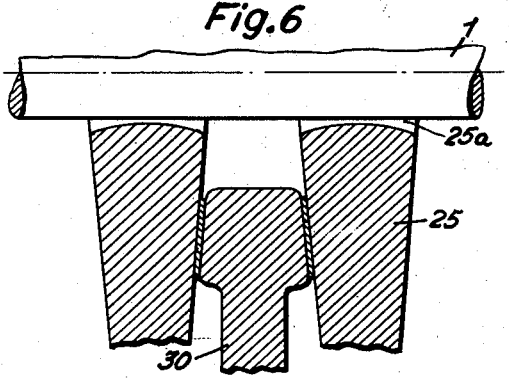
Inventor:
Josef Beier
BY:

Sept. 2, 1958    J. BEIER    2,849,885
FRICTION TRANSMISSION IN TWO RANGES
Filed Nov. 30, 1954    11 Sheets-Sheet 5

Inventor:
Josef Beier
BY:

Sept. 2, 1958　　　　　　　　J. BEIER　　　　　　2,849,885
FRICTION TRANSMISSION IN TWO RANGES
Filed Nov. 30, 1954　　　　　　　　　　　　　　11 Sheets-Sheet 6
Fig. 11
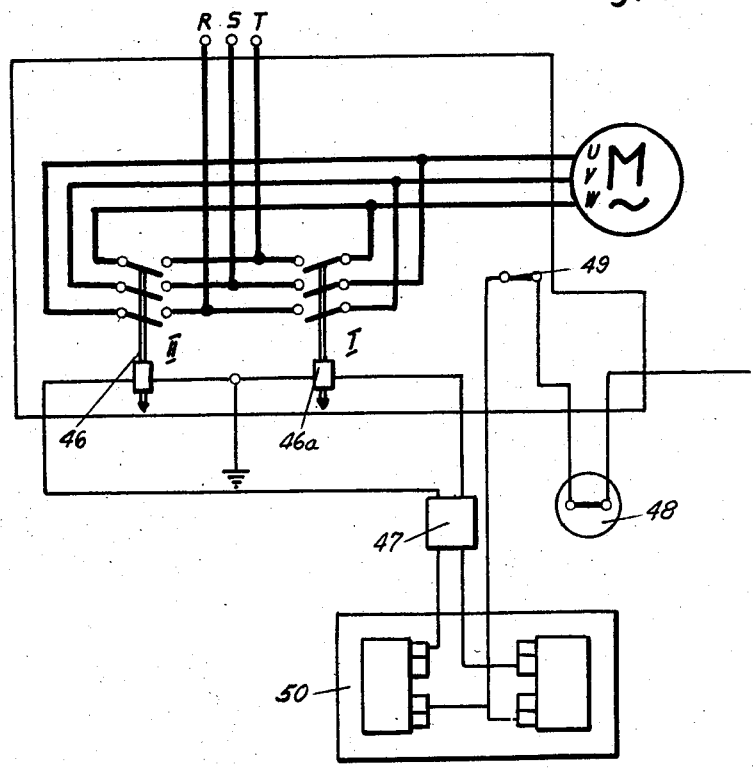
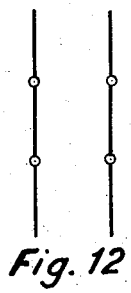
Fig. 12
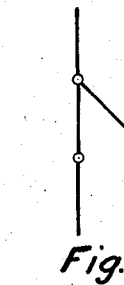
Fig. 13
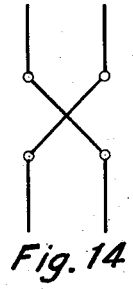
Fig. 14
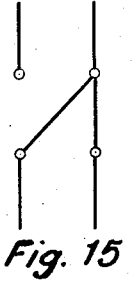
Fig. 15
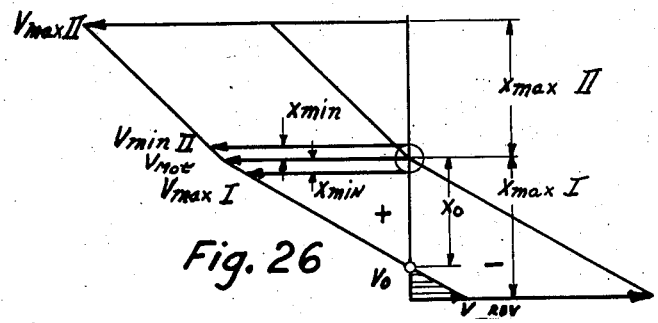
Fig. 26
Inventor:
Josef Beier
BY:
Michael S. Striker
Agt.

Sept. 2, 1958 J. BEIER 2,849,885
FRICTION TRANSMISSION IN TWO RANGES
Filed Nov. 30, 1954 11 Sheets-Sheet 7

INVENTOR
Josef Beier
BY Michael S. Striker
ATTORNEY

Sept. 2, 1958                    J. BEIER                    2,849,885
                    FRICTION TRANSMISSION IN TWO RANGES
Filed Nov. 30, 1954                                    11 Sheets-Sheet 9

Inventor:
Josef Beier
BY:
Michael S. Striker
agt.

Sept. 2, 1958  J. BEIER  2,849,885
FRICTION TRANSMISSION IN TWO RANGES
Filed Nov. 30, 1954  11 Sheets-Sheet 10

Inventor:
Josef Beier
BY:
Michael S. Striker
Agt.

Sept. 2, 1958     J. BEIER     2,849,885

FRICTION TRANSMISSION IN TWO RANGES

Filed Nov. 30, 1954     11 Sheets-Sheet 11

Inventor:
Josef Beier
BY:
Michael S. Striker
Agt.

United States Patent Office 2,849,885
Patented Sept. 2, 1958

2,849,885

FRICTION TRANSMISSION IN TWO RANGES

Josef Beier, Sarnen, Switzerland; Alice Beier, nee Siegenheim, Karlsruhe, Germany, Hans Herbert Beier, East-Boldon, England, and Regine Beier, Karlsruhe, Germany, heirs of the estate of said Josef Beier, deceased Application November 30, 1954, Serial No. 472,197

Claims priority, application Germany December 28, 1953

12 Claims. (Cl. 74—199)

The present invention relates to friction transmissions, and more particularly to a variable friction transmission which operates in two speed ranges.

Gradually variable friction transmissions are known whose transmission ratio can be adjusted within a certain limited range which is not sufficient for all purposes. Particularly, in friction drives of the type in which the friction discs are arranged in a manner resembling planetary gears, the range of the transmission is limited in accordance with the diameters of the friction discs and of the shafts supporting the same. However, for many purposes a greater speed range is desired than can be obtained by the friction drives according to the prior art.

It is the object of the present invention to overcome the disadvantages of the gradually variable friction drives according to the prior art, and to provide a friction drive for operation in a greater speed range.

It is another object of the present invention to provide a gradually variable friction drive which is combined with a planetary gear train in such manner that two speed ranges are obtained.

It is a further object of the present invention to provide a gradually variable friction drive which operates in two consecutive or slightly overlapping speed ranges.

It is a still further object of the present invention to connect planetary gear means to a gradually variable friction drive for obtaining two speed ranges in opposite directions of rotation and to provide means for automatically reversing the direction of rotation of the drive motor to obtain the same direction of rotation of the driven shaft in the two speed ranges.

It is another object of the present invention to obtain in a friction transmission two speed ranges by selectively blocking one or the other of two gears of epicyclic gear means connected to a gradually variable friction drive.

It is also an object of the present invention to provide automatic control means for automatically varying the transmission ratio in each of the two speed ranges of the transmission.

With these objects in view, the present invention mainly consists in variable friction transmission for operation in two speed ranges which comprises, in combination, a first rotary shaft means; second rotary shaft means; first and second friction disc means connected, respectively, to the first and second shaft means for rotation therewith and meshing with each other; movable supporting means supporting the second shaft means for moving the same and the second friction disc means relative to the first friction disc means for varying the transmission ratio between the first and second friction disc means; operating means for the movable supporting means; a first rotary gear; a second rotary gear having a greater diameter than the first rotary gear; a third rotary gear intermediate the first and second gears and meshing with the first and second gears; and gear means connecting the second shaft means with the third gear in any position of the movable supporting means, so that the first and second gears operate in two different speed ranges at rotary speeds which are gradually variable by movement of the movable supporting means. Means are provided for selectively establishing a driving connection between a third shaft means and either the first gear, or the second gear. This would result in reversal of the rotation of the third shaft means, and consequently the direction of rotation of either the first or the third shaft means is again reversed.

According to one embodiment of the present invention, the variable friction transmission comprises first rotary shaft means; at least two second rotary shaft means arranged parallel to the first shaft means; first friction disc means connected to the first shaft means for rotation therewith; at least two second friction disc means, each second friction disc means being connected to one of the second shaft means for rotation therewith and meshing with the first friction disc means; movable supporting means supporting the second shaft means for moving the same and the second friction disc means relative to the first friction disc means for varying the transmission ratio between the first and second friction disc means; operating means for the movable supporting means; a first rotary gear; a second rotary gear having a greater diameter than the first gear; rotary planetary gear means meshing with the first and second gears; gear means connecting in any position of the movable supporting means the second shaft means with the planetary gear means, the rotary speeds of the first and second gears being gradually variable in accordance with the position of the movable supporting means and with the relative position of the first and second friction disc means; a third shaft means; and coupling means for selectively connecting the first and second gears to the third shaft means for rotating the third shaft means within two gradually variable speed ranges.

Since the direction of rotation of the third shaft means is reversed in the two speed ranges, means are provided for reversing the direction of rotation of the drive motor.

According to another embodiment of the present invention, centrifugal means are provided for automatically actuating and operating the movable supporting means so as to gradually change the transmission ratio in accordance with the rotary speed.

In this embodiment of the invention the supporting means of the second shafts are mounted on rotary means, and first coupling means are provided for connecting the inner gear to a stationary support, and other coupling means, such as a flexible brake means, are provided for connecting an outer larger orbit gear to the stationary support. Preferably the brake means are of the type which automatically block rotation in one direction.

In this embodiment of the invention reversal of the direction of rotation of the driven shaft in the second stage of the two speed ranges cannot take place, since planetary gear means move along an orbit gear which is blocked. When the planetary gear means roll on the inner gear, one set of friction discs and the associated first shaft means rotate at a speed which is the result of the speed of the rotary means plus an additional speed effected by the rotation of the planetary friction disc means about the axis thereof. Consequently, in the first speed range the driven shaft rotates at a speed which is higher than the speed of the drive shaft. In the other speed range the conditions are reversed so that the speed of the driven shaft is lower than the speed of the drive shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 6 is a fragmentary sectional view illustrating a detail on an enlarged scale;

Fig. 7 is an end view of a shaft;

Fig. 8 is a fragmentary side view illustrating a detail;

Fig. 11 is a diagram illustrating an electrical circuit of the embodiment of Fig. 1;

Figs. 12–15 are diagrams illustrating positions of a reversing switch means;

Fig. 23 is a fragmentary view illustrating a detail on an enlarged scale;

Figure 25:
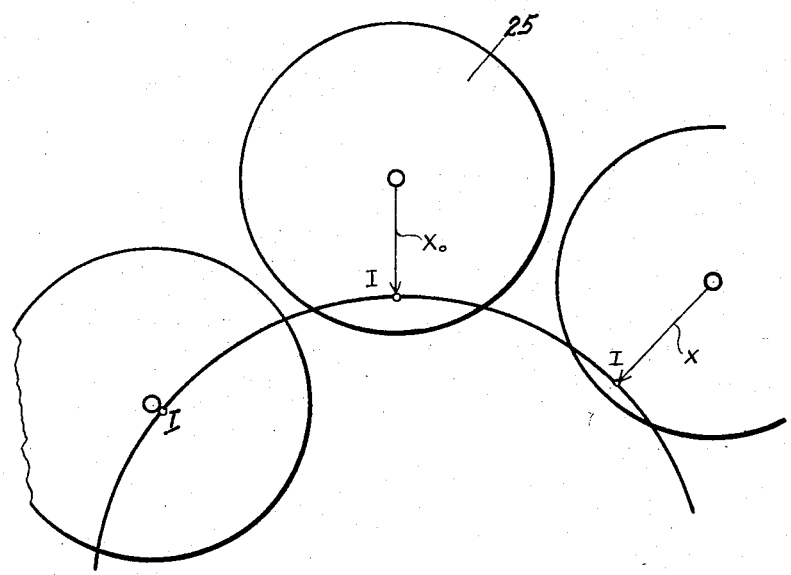

Fig. 25 schematically shows 3 operational positions of co-operating friction discs; and Fig. 26 is a vector diagram illustrating the speeds within the two ranges of the transmission depending on the effective radius of the friction disc means.

Figure 1:
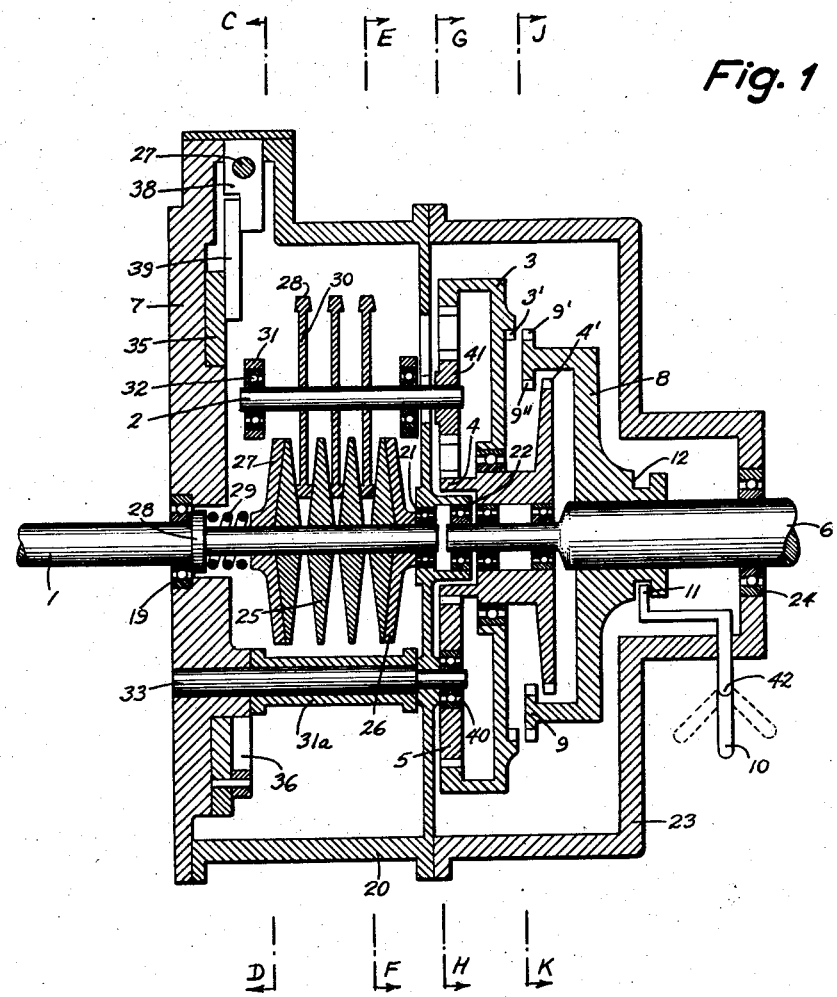
Fig. 1 is an axial sectional view taken on line A—B in Fig. 2.
Figure 2:
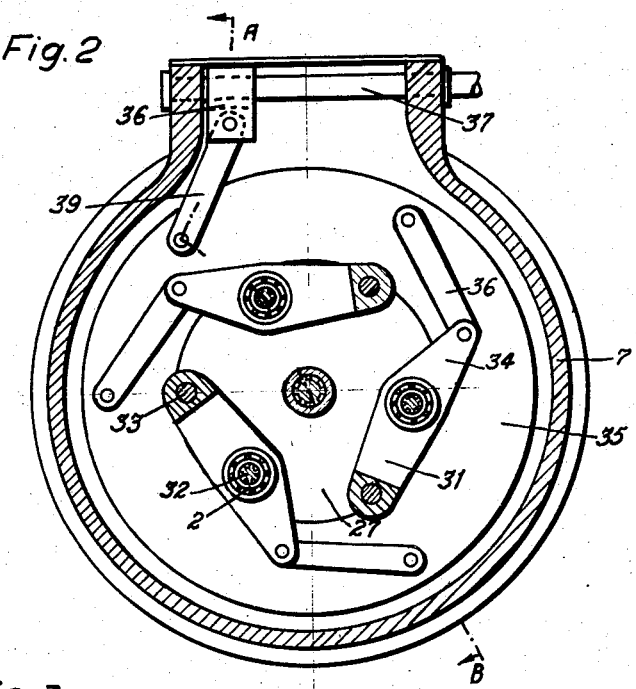
Figs. 2–5 are cross-sectional views taken in Fig. 1 on lines C—D, E—F, G—H, J—K, respectively.
Figure 3:
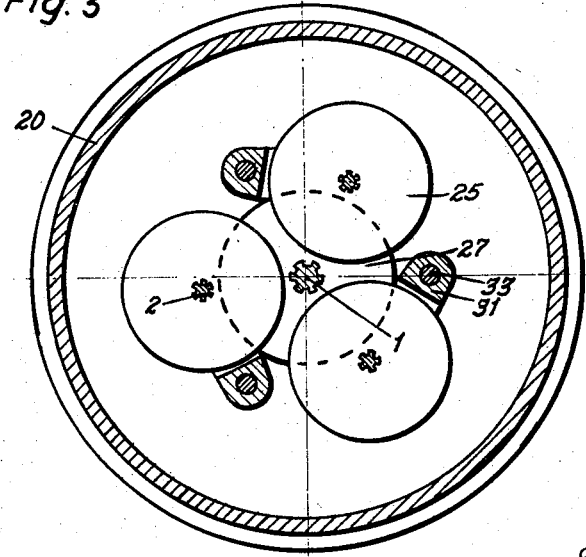
Figure 4:
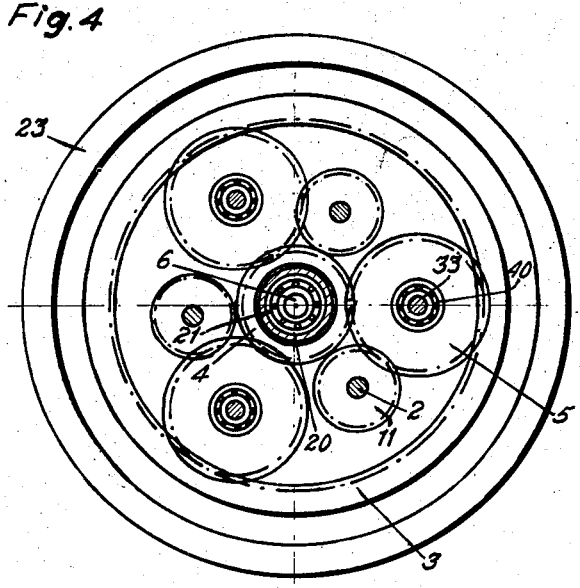
Figure 5:
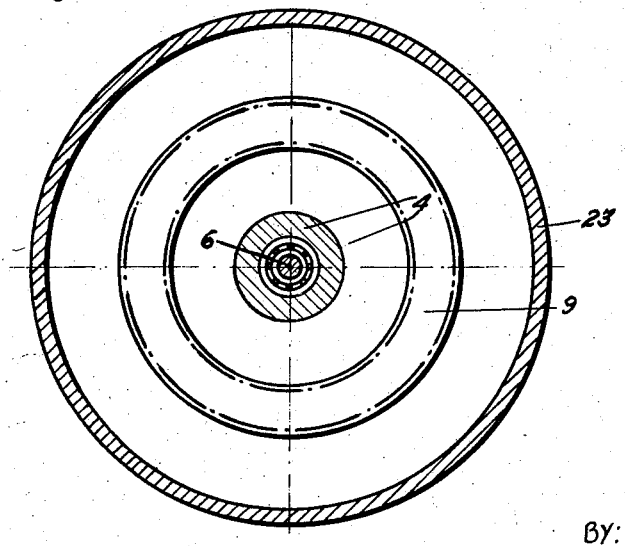
Figure 9:
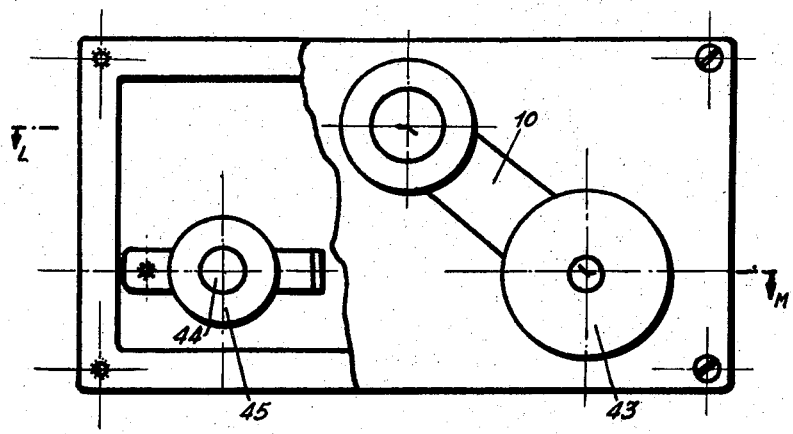
Fig. 9 is a front view of a control means applied in the embodiment illustrated in Fig. 1.
Figure 10:
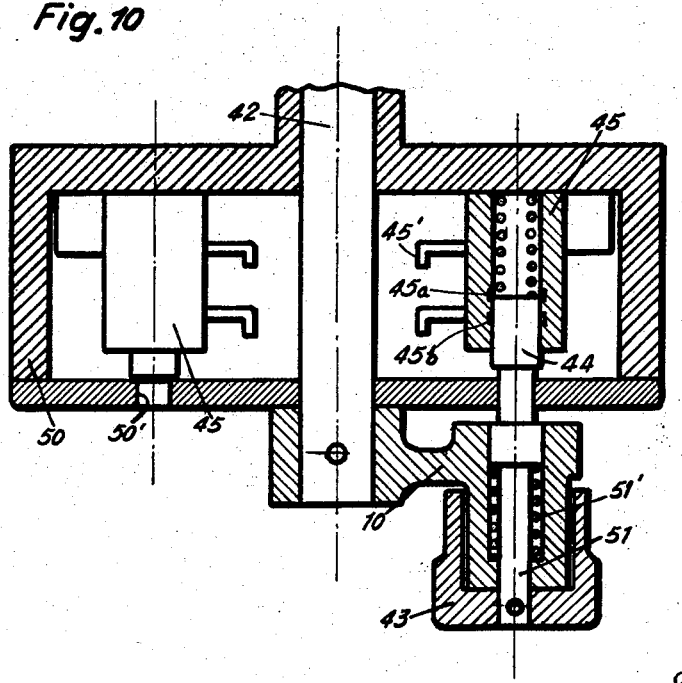
Fig. 10 is a sectional view taken on line L—M in Fig. 9.

In the embodiment illustrated in Fig. 1, the shaft 1 is the drive shaft, and the shaft 6 is the driven shaft. However, the transmission may also be operated with the shaft 6 as drive shaft.

Shaft 1 is mounted in ball bearing 19 in the casing portion 7 and in ball bearing 21 in the casing portion 20. One end of shaft 6 is mounted in a ball bearing 22 in the casing portion 20, and in another ball bearing 24 in the casing portion 23. The casing 7, 20, 23 may be supported on the motor by which shaft 1 is driven or on any other supporting means.

Shaft 1 supports a set of friction discs 25 which are mounted thereon non-rotatable and slidable in axial direction. The shaft 1 is preferably provided with grooves and projections as illustrated in Fig. 7, and the friction discs 25 have central bores which are correspondently shaped. As best seen in Fig. 6, the friction discs 25 have conical side faces which are in frictional engagement with the peripheral friction rims of the friction discs 30. The central bores 25a of the friction discs 25 are convex and arcuate so that the friction discs 25 may assume an oblique position when the friction rims of the discs 30 engage thinner peripheral portions of the friction discs 25. Moreover, the shape of the central bores 25a facilitates axial sliding of the friction discs and prevents binding during axial sliding.

The shaft 1 is provided with a flange 28 directly adjacent the ball bearing 19. A spring 29 is arranged between the fixed flange 28 and a movable pressure member 27 which is mounted on shaft 1 non-rotatable and slidable in axial direction so as to press the friction discs 25 against the fixed pressure member 26 and into frictional engagement with the friction rims of the friction discs 30.

The friction discs 30 are mounted on shafts 2 which are provided with projections and grooves similar to shaft 1, as shown in Fig. 7. The friction discs 30 have corresponding central bores provided with an arcuate convex surface as described with reference to the friction discs 25. The friction discs 25 and 30 are mounted on their respective shafts with ample play to facilitate axial sliding.

In the illustrated embodiment, three shafts 2 are provided, but it will be understood that one, or two shafts 2 would also accomplish the results of the present invention. Similarly, the operation of the friction drive according to the present invention will not be changed if the friction discs 30 are of the type having conical side faces, and the friction discs 25 are of the type having friction rims.

The shafts 2 are mounted on movable supporting means which comprise supporting arms 31 and a hub portion 31a turnably mounted on pins 33 which are supported in the casing portions 7 and 20. The shafts 2 are mounted in ball bearings 32 in the arms 31. An operating arm 34 is connected to each supporting arm 31 and connected by a link 36 to an operating ring 35 which is turnably mounted on the casing portion 7.

The two casing portions 7 and 20 together form a guide means for a nut member 38 which is slidable between the casing portions 7 and 20, but cannot turn. An operating spindle 37 threadedly engages the nut member 38 and is mounted in the casing turnable but non-movable in axial direction thereof. Consequently, turning of the spindle 37 by suitable operating means will result in turning of the ring 35 which is connected to the nut member 38 by a link 39.

When the ring 35 is turned by the above-described means, the movable supporting means 31a, 31 are pivoted about the respective pins 33, and the shafts 2 are shifted together with the friction discs 30 between a position in which the friction discs 30 deeply project between the friction discs 25 and a position in which the friction discs 30 engage the peripheral portions of the friction discs 25. Since the effective radius of the friction transmission is the distance between the rims of the friction discs 30 and the axis of rotation of shaft 1, the ratio of transmission is changed when the supporting arms 31 are pivoted by operation of the operating means 35, 37, 38, 39 as described above.

In the position in which the shafts 2 are farther spaced from the shaft 1, the friction discs are more closely spaced, and are urged into engagement by the pressure member 27. The pressure member 26 abuts against the ball bearing 21 which is mounted in the inner wall of the casing and is prevented from moving in axial direction. The shape of the central bores of the friction discs facilitates the axial sliding of the friction discs into the required position.

On each shaft 2 is mounted a gear 41 for rotation therewith and continuously meshes with an intermediate gear 5 which is freely turnable on the respective pin 33 on which it is mounted by means of a ball bearing 40. An internal outer gear 3, and a smaller gear 4 are arranged coaxial with the shafts 1 and 6. The gears 5 mesh with the gears 3 and 4 and with the gears 41 and simultaneously transmit the rotary movement of the shafts 2 to the gears 3 and 4. Gears 3 and 4 are mounted on ball bearings. Gear 4 is mounted on ball bearings on shaft 6, and the internal gear 3 is mounted on a ball bearing on the hub portion of gear 4.

The gears 3 and 4 are provided with coupling claws or teeth 3' and 4', respectively, which are shown in Fig. 8 on an enlarged scale. A coupling means 8 is arranged on shaft 6 non-rotatable and slidable in axial direction and can be shifted by an operating lever 42 between a first coupling position in which the coupling teeth 9' thereof engage the coupling teeth 3' of gear 3, and another coupling position in which the coupling teeth 9'' engage the coupling teeth 4' of gear 4. The coupling teeth 9', 9'' are provided on the flange portion 9 of the coupling means 8. It will be apparent that the transmission ratio between the shafts 2 and the shaft 6 is different when the larger gear 3 connects the gear 5 with the shaft 6 and when the smaller gear 4 connects the gear 5 with the shaft 6 through the coupling means 8.

Since by operating the movable supporting means 31a, 31, the transmission ratio of the friction transmission 25, 30 can be gradually changed, the above-described friction transmission permits a gradual change of the transmission ratio within two ranges in accordance with the position of the coupling means 8. The number of teeth of the internal gear 3, and the number of teeth of the gear 4 are so chosen that the two speed ranges of the transmission overlap, or directly follow each other.

However, the gears 3, 4, 5 not only provide two ranges of the transmission, but also reverse the direction of rotation of shaft 6 in the two positions of the coupling means 8. In some cases, this may be desirable, but according to one embodiment of the present invention the direction of rotation of the shaft 1 is reversed when the coupling means are shifted so that shaft 6 rotates in the same direction as shaft 1 in both ranges of the transmission.

According to one embodiment of the present invention the drive motor driving shaft 1 (or shaft 6 if desired) is an electric motor, and means are provided for reversing the electric motor when the coupling means 8 is shifted. A shaft 42 is connected to the operating lever and to lever 10 so that movement of lever 10 between the three positions indicated in Fig. 1 will move the coupling means 8 between two operative positions, and the position illustrated in Fig. 1 in which the coupling teeth 9', 9" do not engage any one of the gears 3 and 4.

The lever 10, and shaft 42 constitute operating means for moving the coupling means 8, 9 between the operative positions of the same.

Referring now to Figs. 9-15, the shaft 42 passes through a switch box 5D on which the lever 10 is mounted. The lever 10 carries a cup-shaped grip member 43 to which a pin 51 is secured. Members 43, 51 are urged by a spring 51' into the position illustrated in Fig. 10 in which a detent portion of pin 51 projects into a bore 50' in the switch box 50. When the cup-shaped grip member 43 is retracted against the action of the spring 51', the lever 10 can be turned into another operative position in which the pin 51 projects into another bore 50' corresponding to the positions I and II shown in Fig. 1.

Two contact means are provided in the box 50 opposite the bores 50' and each contact means includes an insulating tubular body 45, terminals 45', contacts 45a and 45b and a movable contact member 44 which is urged by a spring into an outwardly projecting position in which the two contacts 45a and 45b are not connected. When the operating lever 10 is turned into a position in which the pin 51 projects into a bore 50' and resiliently presses the contact member 44 into the tubular body 45, the contacts 45a and 45b are connected by the contact member 44.

The drive motor M is shown in the diagram of Fig. 11 and may be connected to any one of the shafts 1 or 6. In the circuit of the motor two relay switches 46 and 46a including electromagnetic relay means are arranged. The relays are connected to a reversing switch means 47, which is connected to the terminals 45'. The reversing switch means 47 can be moved between four positions illustrated in Figs. 12-15. When the operating lever 10 is in one of its two operative positions in which the respective contacts 45a, 45b are closed, the respective relay 46, 46a is operated to close the circuit of the motor. While the operating lever 10 is in a position between the two operative positions I, II, the relays 46, 46a are disconnected and the motor is not energized and at a standstill. Consequently the reversal of the transmission takes place while the motor does not rotate.

When the reversing switch means 47 is in the position illustrated in Fig. 12 the driven shaft rotates in the two ranges of the transmission in the same direction with the motor reversed. Fig. 13 shows the position of the reversing switch in which the driven shaft rotates in opposite directions, while the motor rotates in the same direction. In the position of Fig. 14 the motor is reversed, but the driven shaft rotates in the same direction of rotation in both ranges of the transmission. In the position of Fig. 15 the motor rotates in the same direction, and the drive shaft rotates in the two ranges of the transmissions in opposite directions, but in each range in a direction opposite to the direction of rotation obtained in the position shown in Fig. 13.

From the above description it will be apparent that the elements 46, 47 constitute reversing means which are operated by the control means 44, 45 in accordance with the position of the operating means 10, 42.

Figure 16:
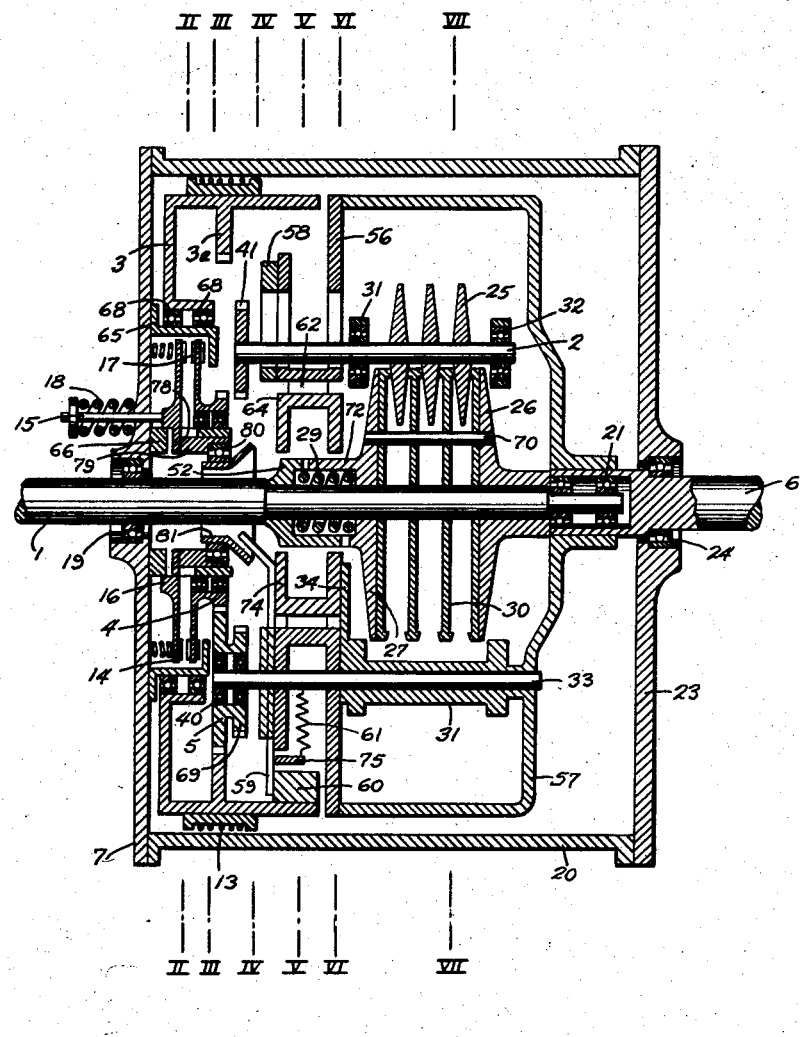
Fig. 16 is an axial sectional view of another embodiment of the present invention taken on line I—I in Fig. 17.

Referring now to the embodiment of the invention illustrated in Figs. 16-24 which is mainly intended to operate as an automatic friction transmission for motor cars, the motor shaft is at the same time the drive shaft 6 of the transmission illustrated in Fig. 16. Shaft 6 is mounted in the casing 23 in ball bearings 24 and carries a fixedly secured drum or flywheel 57. The driven shaft 1 is mounted in a ball bearing 21 in the drive shaft 6, or in the drum 57, and in the casing 7 by means of ball bearing 19. The pins 33 are fixedly mounted in the drum 57 and turnably support the supporting means for the shafts 2. The supporting means include a hub portion 31a and supporting arms 31 in whose ends ball bearings 32 are mounted for turnably supporting the shafts 2. The friction disc means 25 are of the type having conical side faces, and the friction disc means 30 of the type having conical friction rims so that pivoting of the arm 31 results in a change of effective radius of the friction transmission. The arrangement may be reversed.

Shafts 1 and 2 are preferably formed with grooves and projections as illustrated in Fig. 7, and the friction discs mounted thereon have central bores formed with corresponding projections and grooves so that the friction discs are connected to the respective shafts for rotation therewith and are slidable on the same in axial direction. The convex arcuate shape of the central bores of the friction discs permits the friction discs to assume the slightly oblique position during axial sliding and also prevents binding of the friction discs.

A fixed pressure member 26 is mounted on shaft 1 abutting against the drum 57, and a movable pressure member 27 is arranged on the other side of the set of friction means 30 for pressing the friction discs 30 together and into engagement with the friction discs 25. Bolts 70 are arranged between the pressure members and pass through bores in the friction discs 30 and in the movable pressure member 27.

A sleeve-shaped wedge means 72 is fixedly connected to the movable pressure member 27 and has a plurality of wedge-shaped claws 55 having helical wedge faces 73 which cooperate with the claws 53 and the wedge faces 54 of a sleeve-shaped wedge means 52 which is fixedly connected to the shaft 1 and abuts against a shoulder in the same. A compression spring 29 is arranged between the wedge means 72 and the wedge means 52, and urges the movable pressure member in axial direction to press the friction discs 25 and 30 together. The pressure exerted by the spring must be sufficient to prevent slipping of the friction discs at idle speed. During rotation of the drive shaft 6 the wedge means 52 exert an axial pressure on the wedge means 72 for urging the movable pressure member 27 against the friction discs with a force corresponding to the torque transmitted by the shaft 6.

Each shaft 2 carries a gear 41 which is fixedly connected thereto and meshes with a gear 69 which is freely turnably mounted on the respective pin 33 by means of a ball bearing 69. During pivoting of the supporting arm 31, the gears 41 and 40 remain in meshing engagement since the axis of shaft 2 moves in an arc around the axis of pin 33. A planetary gear means 5 is fixedly connected to each gear 69 and meshes with a small sun gear 4 and with a larger internal orbit gear 3a which is part of a gear member 3 fixedly connected to a brake drum 3. The small sun gear 4 is mounted by means of a ball bearing 67 on a member 66 which is fixedly secured to the casing 7. The gear member 3 is mounted in a ball bearing 68 on a member 65 which is fixedly secured to the casing 7. Gears 3a, 4 and planetary gear means 5 constitute an epicyclic gear means.

A flexible brake means 13 passes around the outer surface of the brake member 3 and operates in a known manner to permit rotation of the member 3 and of gear 3a only in one direction of rotation.

Figure 17:
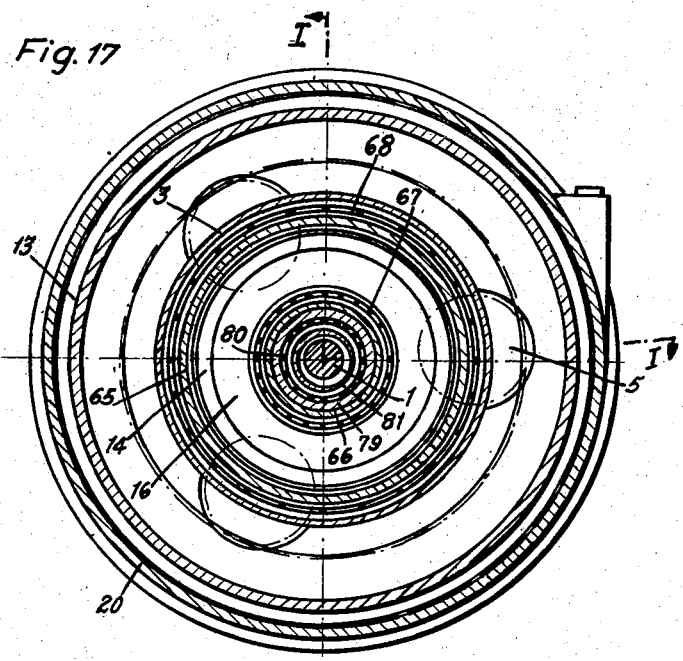
Figs. 17–22 are cross-sectional views taken in Fig. 16 on lines II—II, III—III, IV—IV, V—V, VI—VI, VII—VII, respectively.
Figure 18:
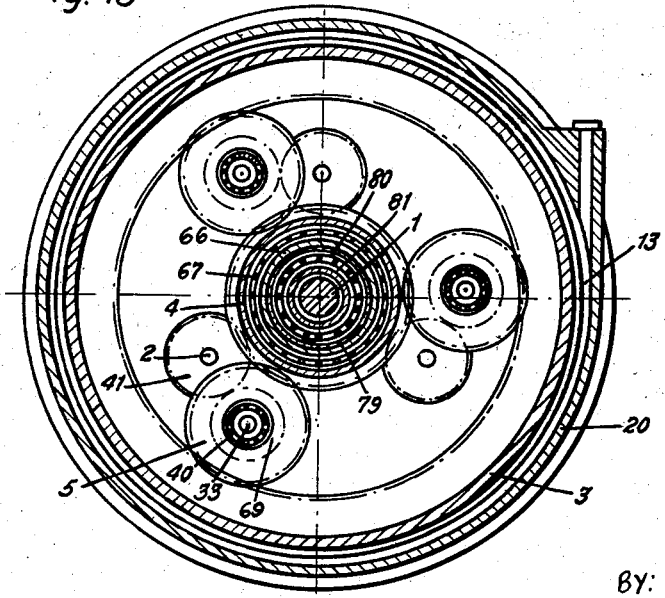
Figure 19:
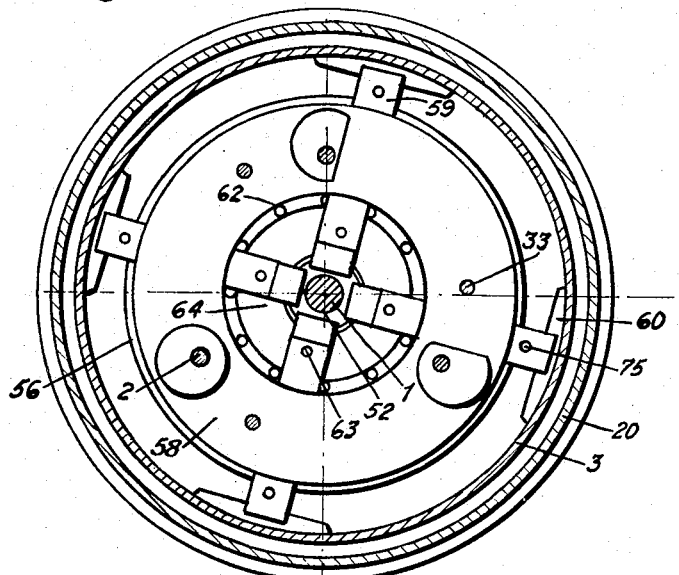
Figure 20:
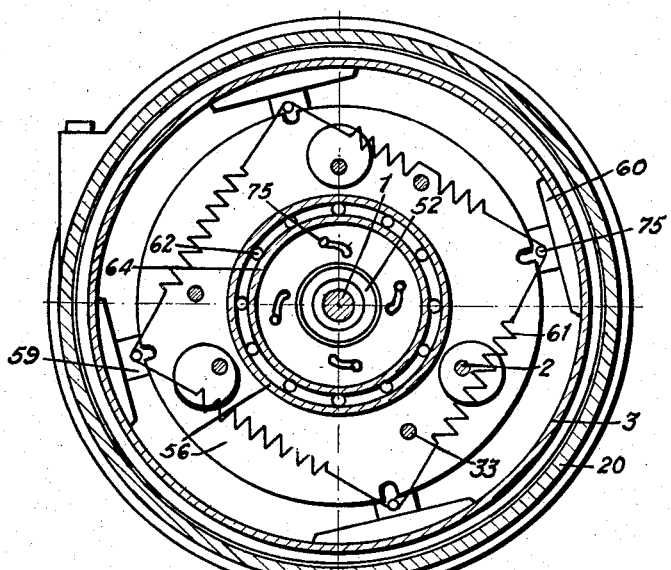
Figure 21:
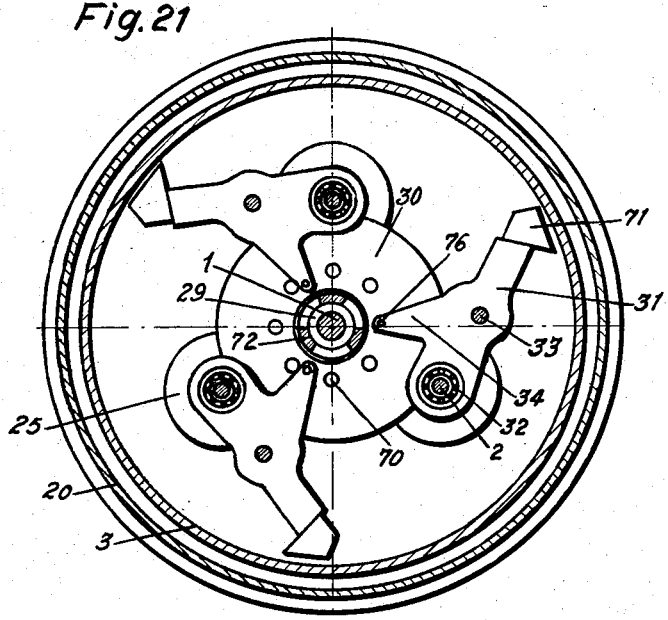
Figure 22:
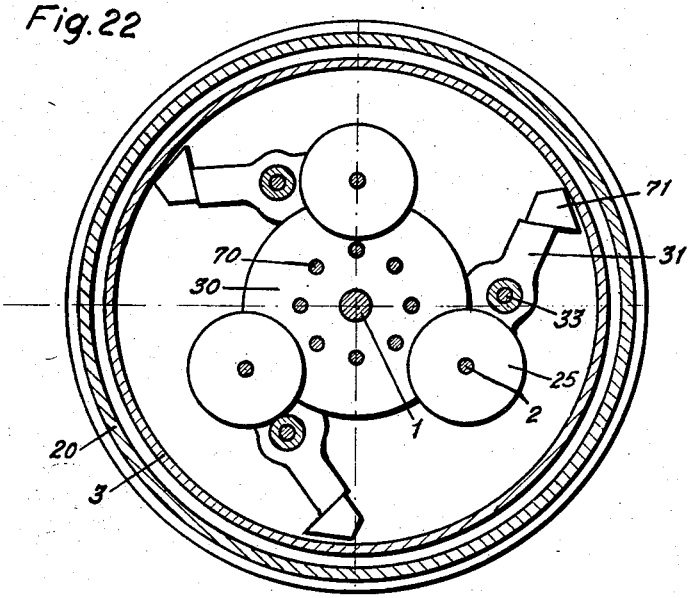
Figure 24:
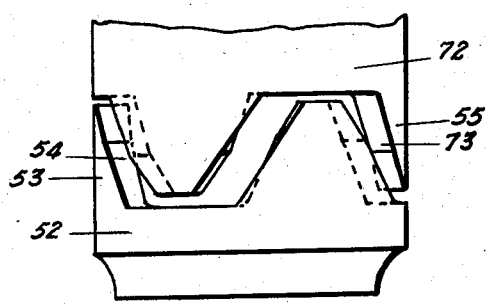
Fig. 24 is a fragmentary front view illustrating a detail.

When the drum 57 is rotated in counterclockwise direction in Fig. 17, the gears 5 and 69 on the pins 33 rotate in clockwise direction and turn the gears 41 and therewith the friction discs 25 in counterclockwise direction.

As shown in Fig. 25, during rotation in this manner, the point I of the friction discs 25 which is in engagement with the friction rims of the friction discs 30 moves in opposite direction with respect to the direction of rotation of the rotary means 6, 57. The absolute speed of this point is the difference between the rotary speed of the respective shaft 2 and the speed of the engaging point of the respective friction discs which point moves in opposite direction as described above. The speed of the engaging point I depends on the effective radius of the friction disc 25. When the effective radius X is small, the speed of the shafts 2 is greater than the opposite speed of the engaging point I which transmits the motion to the friction discs 30. This operational condition is illustrated on the left of Fig. 25. Since the engaging point I moves with the shafts 2 in this condition of transmission, the friction discs 30 and the shaft 1 turn in the same direction as the rotary means 6, 57 which corresponds to forward drive. If the effective radius X of the friction discs is increased by shifting the supporting levers 31, the speed of the peripheral rim portions of the friction discs 30 is reduced, since the rearward components of the speed transmitted by the engaging point I of the friction discs 25 increases with the effective radius. At a certain effective radius $X_0$ the difference between the speed of the respective shaft 2 and the opposite speed of the engaging point I is zero, so that the points I do not move relative to the friction rims of the friction discs 30 although the rotary means 6, 57 and the friction discs 25 turn. Consequently the friction discs 30 are not driven in this position which is illustrated in the center portion of Fig. 25. When the shafts 2 are further retracted by the supporting arms 31 so that the effective radius of the friction discs 25 is increased beyond the value $X_0$ as illustrated on the right side of Fig. 25, the speed of the engaging point I of the friction discs 25 due to the rotation of the friction discs 25 about the shaft 2 is greater than the speed of the engaging points I due to the movement of the shaft 2 together with the rotary means 6, 57 so that the engaging points, and therewith the friction discs 30 start moving in clockwise direction, that is in a direction opposite to the rotation produced in the position of the friction discs illustrated on the left side of Fig. 25.

These conditions may be mathematically expressed by the following equation:

$$T = 1 - \frac{X.r3a.r69}{R30.r41.r5}$$

The characters in the above equation have the following meaning:

$T$ = transmission ratio between drive shaft and driven shaft.
$X$ = the variable effective radius of the conical friction discs 25.
$R30$ = the radius of the friction rim of the friction discs 30.
$r3a$ = the radius of the internal gear 3a.
$r41$ = the radius of the gear 41.
$r5$ = the radius of the gear 5.
$r69$ = the radius of the gear 69.

The value $$\frac{r3a.r69}{R30.r41.r5}$$

is constant and known so that the transmission ratio may be expressed by the equation:

$$T = 1 - X.K$$

An analysis of the above equation proves that shaft 1 rotates in the same direction as the drum 57 and the drive shaft 6 when the second element on the right side of the equation is smaller than 1. If this element is greater than 1, the driven shaft 1 rotates in a direction opposite the rotation of the drive shaft 6. When $X.K = 1$, the driven shaft 1 is at a standstill. The equation also shows the transmission ratio as a linear function of effective radius X of the friction discs 25.

A corresponding equation can be formed for the smaller sun gear 4:

$$T = 1 + \frac{X.r4.r69}{R30.r41.r5}$$

in which equation $r4$ is the radius of the sun gear 4. The value $$\frac{r4.r69}{R30.r41.r5}$$

is constant and known so that the transmission ratio may be expressed by the equation:

$$T = 1 + X.K_1$$

The diagram of Fig. 26 clearly shows the relation between the variable speeds and the motor speed. The lower portion of the diagram illustrates the equation $T = 1 - X.K$, while the center of the diagram illustrates the direct coupling of the transmission with the motor shaft. The width of this strip corresponds to the diameter of the shafts 2. When the transmission is switched from the orbit 3 to the sun gear 4, the direct coupling is released, and the rotary speed of the transmission is further increased. Such increase can only take place after the maximum transmission ratio is reached. This is shown in the upper portion of the diagram of Fig. 26 corresponding to the equation $T = 1 + X.K_1$.

The lower portion of the diagram of Fig. 26 also illustrates the equation regarding the speeds:

$$V = V_{mot} - X.K$$

The analysis of the speed equation corresponds to the analysis of the transmission ratio equation. The resultant variable speed V can have a positive or a negative sign, or may be zero. In the first range (I), the rearward speed drops to the speed $V_0$ and then increases to the speed $V_{max\ I}$. The speed directly jumps from the speed $V_{max\ I}$ to the speed $V_{mot}$ which is caused by direct coupling as will be described hereinafter. This sudden change of speed is caused by the smallest effective diameter corresponding to the diameter of the shaft 2. The smaller the diameter of the shaft 2 is, the smaller is the abrupt speed change.

In the second range there is also a sudden change before the speed $V_{min\ II}$ is reached. Before connecting the range II, the direct coupling is released.

The speed increase starts in the second range at $V_{min\ II}$, and the driven shaft may reach the maximum speed $V_{max\ II}$. The equation for the range II is $$V = V_{mot} + X \cdot K_1$$

and shown in the upper portion of the diagram. The same is true for the equations concerning the number of revolutions:

$$n = n_{mot} - n_k\ _I \cdot X$$

and $$n = n_{mot} + n_k\ _{II} \cdot X$$

The characters in the diagram and in the above equations have the following meanings:

$V_{mot}$ is the motor speed
$V_0$ is the zero speed
$V_{min\ I}$ is the lowest speed in range I
$V_{min\ II}$ is the lowest speed in range II
$V_{max\ II}$ is a greater speed in range II
$V_{rev}$ is the rearward speed
$X_{min}$ is the smallest effective radius
$X_0$ is the effective radius during idling
$X_{max}$ is the maximum effective radius
$n$ is the number of revolutions of the driven shaft
$n_{mot}$ is the number of revolutions of the motor shaft
$n_{k\ I}$ is the number of revolutions in range I
$n_{k\ II}$ is the number of revolutions in range II.

The pins 33 which carry the supporting arms 31 are extended to project into bores in a flange 56 which is integral with the rotary member 57. An operating arm 34 is secured to each hub portion 31a and carries at the end thereof a slide pin 63 which projects into slots 77' in the annular cam means 64 whereby all supporting means 31 are forced to simultaneously move. The annular member 64 has a U-shaped cross section and comprises two annular discs connected by a transverse annular connecting portion. As best seen in Fig. 23, in one of the annular discs are provided radial slots 77' for the slide pins 63 and in the other annular disc are provided curved cam slots 77 for the control mechanism of the friction drive. The cam slots 77 receive rollers 74 mounted on pins which are secured to members 59, and have such shape that the rollers 74 of the members 59 are in outermost position in radial direction when the smallest effective radius $X_{min}$ of the friction discs 25 is reached. The annular means 64 is turnably mounted on ball bearing 62 in the flange 56 in order to transmit the controlling forces of the members 59 without great frictional losses. The flange 56 is formed with radial grooves and constitutes together with the ring 58 a guide means for the members 59 for guiding the same in radial directions. A friction member 60 is secured to the outer end of each member 59 and is urged by centrifugal force against the inner surface of the outer member 3. As soon as the cam follower rollers 74 of the member 59 reach their outermost position in which the friction members 60 engage the orbit gear 3, the orbit gear 3 is coupled with the rotary means 6, 57, 56 and is taken along by the same in a direction of rotation which is opposite to the direction of rotation in which the flexible brake means 13 blocks the gear member 3 so that the gear member 3 is released by the brake means 13. A bolt 75 is secured to member 59 to which return springs 61 are connected which counteract the centrifugal force exerted by the counter weights 71 and by friction coupling members 60.

The operation of the control means is as follows:
When the rotary means 57 and the supporting arms 31 rotate in counterclockwise direction at idle speed, the springs 61 overcome the centrifugal force and move the friction discs 25 into their outermost position corresponding to the maximum effective radius. Since the vehicle and thereby also the friction disc means 30 are at a standstill and oppose a turning in rearward direction due to friction and inertia resistance, the gear 3 is released by the brake means 13 and also rotates in counterclockwise direction. When the rotary speed of the rotary means 6, 57 is increased by accelerating the drive motor, the centrifugal forces acting on the counterweights 71 urge the friction discs 25 deeper between the friction discs 30 so that the effective radius X is gradually reduced to the above defined value $X_0$. During movement of the friction discs 25 from their outermost idling position to the position in which the effective radius is $X_0$, the rotary speed of the outer gear 3 is reduced although the speed of the drive shaft increases and after reaching the effective radius $X_0$ tends to change its direction of rotation. This, however, is prevented since the brake means 13 blocks rotation of the gear member 3 in opposite direction so that the gear member 3 is stopped and the drive is transmitted through planetary gear means 5 to the driven shaft, the vehicle and the driven shaft is accelerated starting at a transmission ratio of $1:\infty$. When the rotary speed of the drive shaft is further increased, the friction discs 25 are urged by the centrifugal operating means to more deeply project between the friction discs 30 so that the vehicle is further accelerated and the transmission ratio approaches the value 1:1.

By suitably designing the control mechanism, any desired characteristic of acceleration can be obtained, and it is possible to control the transmission in such manner that the transmission ratio is adapted to the load in such manner that a minimum fuel consumption is obtained.

In the event that the transmission ratio approaches the value 1:1 to approximately 15% to 20%, the friction discs 25 assume a position which corresponds to the minimum effective radius X. In this position the slide pin 63 of the movable supporting means 31 turn the cam means 64 to such extent that the members 59 with the cam follower rollers 74 reach under the action of the centrifugal force the deepest portion of the curved cam track 77 which is recessed, as best seen in Fig. 23. When the rollers 74 pass over the edges of these recesses, the centrifugal force acting on the friction members 60 exerts an additional turning moment on the annular means 64 by which all supporting arms 31 which are coupled to the cam disc 64 are pivoted into a position in which all friction discs 25 are moved further inwardly so that the smallest effective radius becomes operative. At the same time the friction coupling members 60 engage the inner surface of the gear member 3 and couple the same with the rotating drum 57 and with the drive shaft 6. In this position the entire transmission is connected for rotation, constituting a direct drive. Since the centrifugal force acting on the friction coupling members 60 increases with the motor speed, the coupling between the member 3 and the rotary means 6, 57 is obtained at a force proportional to a higher motor speed at the moment of coupling.

When the rotary speed is reduced, the force exerted by the springs 61 overcomes the centrifugal force, and the rollers 74 of the members 59 are pressed against the inner edge of the cam slots 77 whereby the annular means 64 is turned in opposite direction as compared with the previous turning due to the centrifugal force.

When the vehicle continues to drive in direct drive at gradually reduced motor speed until the rotary speed drops below the rotary speed required for coupling, rollers 74 are lifted in tangential direction out of the recesses of the cam slots 77 in the cam means 64 and consequently retract the members 59 so that friction coupling members 60 release the inner surface of the gear member 3. Thereupon the driving connection between the rotary means 57 and the outer gear member 3 is interrupted.

In order to adapt the control mechanism to the desired operational conditions the centrifugal weights 71, friction coupling members 60, and the return springs 61 are exchangeable and can be replaced by heavier or lighter weights 71, or by stronger or weaker springs, respectively. It is also advantageous to pre-tension the springs 61. Thereby it is possible to adjust the response and the operational range of the control mechanism within desired limits.

The shifting force exerted by the centrifugal weights and by springs 61 on the annular means 64 is transmitted uniformly and simultaneously to the operating arms 34 of the movable supporting means of all friction discs 25 so that the annular means 64 actuates the operating means which change the transmission ratio of the friction drive. When the annular means 64 is turned, the slide pins 63 slide in the radial slots 77' and the supporting arms 31 are pivoted so that the shafts 2 together with the friction discs 25 vary their distance with respect to shaft 1. When the supporting arms are pivoted, the friction discs 25 project more or less between the rim discs 30 and consequently operate with different effective radii and at different transmission ratios. Due to the fact that the friction discs 25 are thicker near the central bores thereof than at the peripheral portion thereof, the friction discs 30 must move apart when the friction disc 25 more deeply project between the same. Since the friction discs 30 are easily slidable in axial direction, they can always assume the position corresponding to the thickness of the engaged portions of the friction discs 25. Similarly, the friction discs 25 must move apart, when deeper inserted between friction discs 30, which is facilitated by the construction of the shafts 2 and of the central bores in the friction discs 25.

If the vehicle is at a standstill and the motor rotates at a low rotary speed, the friction discs rotate due to the small centrifugal force acting on the centrifugal weights outside of the effective radius $X_0$ so that the gear member 3 rotates in the same direction as the motor. When the gear member 3 is braked by operating the brake means 13 during rotation in this direction, the driven shaft must move in a direction opposite to the direction of rotation of the motor and the vehicle will move rearwardly. If the motor speed is increased in this position, the rearward speed of the vehicle is generally not increased since the increasing centrifugal forces exerted on the centrifugal weights urged the friction discs 25 deeper between the friction discs 30 so that at high motor speeds the vehicle stops or even starts forward movement when the effective radius $X_0$ or an effective radius even smaller than the radius $X_0$ is reached. Consequently, the vehicle moves in rearward drive faster when the motor speed is reduced.

During the above described operation the inner sun gear 4 rotates since it is in continuous meshing engagement with the gear 5. The orbit gear 3a is blocked by the brake 13 so that the planetary gears can roll thereon. The flexible brake means 13 is preferably constructed as self-locking one way brake and consists of a few loops of resilient wire which loosely pass around the outer surface of the gear member 3. One end of the resilient wire loops is fixedly connected to the stationary casing 20 while the other end thereof is connected to an operating lever and can be tensioned by the same so that the resilient loops are pressed against the outer surface of gear member 3 and block the same to prevent rotation.

The inner sun gear 4 is connected with a disc coupling means operated by pressure on the pin 15 which urges the pressure disc 16 against the lining of the disc coupling means 14 for pressing the same against a coupling member 17 which is fixedly connected to the casing 7 by member 65. A return spring 18 is provided for returning the pressure disc 16 to its releasing position.

The members 59 which carry the centrifugal weights 60 have inner ends which angularly project at an angle of 45°. When the pin 15 is shifted to the right, as viewed in Fig. 16, for actuating the coupling means 14, not only the coupling means 14 but also a sleeve member 79 is shifted by means of pins 78. A tubular member 81 having a flaring frusto-conical portion is mounted in the sleeve 79 by means of a ball bearing 80. When the sleeve 79 and the tubular member 81 are shifted to the right, the frusto-conical portion engages the angular projecting inner ends of the members 59 and urges the same inwardly against the action of the centrifugal force. Thereby friction coupling members 60 release the gear member 3 at the same time as the coupling 14 connects the inner sun gear 4 to the stationary supporting casing and shaft means 1 rotates within the second speed range. The gear member 3 is mounted on member 65 by means of ball bearings 68. When the coupling 14 is actuated, the brake means 13 is automatically released and orbit gear 3a rotates freely. If, however, the brake means 13 is actuated and blocks the gear member 3, the coupling 14 of the inner sun gear 4 is automatically released.

By the above described shiftable coupling means 14 and 13, the gears 3 and 4 are selectively coupled to the stationary support 7 and blocked for selectively establishing a driving connection between shaft 6 and the gear 3, or the gear 4, respectively which is not blocked. The planet gear means 5 correspondingly roll either on the inner sun gear 4 or on the outer orbit gear 3a whereby the transmission operates in two different speed ranges. As described above, the arrangement is such that one speed range is below the rotary speed of shaft means 1, and the other speed range is above the rotary speed of shaft means 1.

It will be understood that each of the elements described above, or two or more together, may also find a useful application in other types of friction transmission differing from the types described above.

While the invention has been illustrated and described as embodied in a variable friction transmission operable in two speed ranges and including epicyclic gear means and means for selectively blocking rotation of the sun gears of the epicyclic gear means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Variable friction transmission operable in two speed ranges comprising, in combination, first rotary shaft means; second rotary shaft means; first and second friction disc means connected, respectively, to said first and second shaft means for rotation therewith and meshing with each other; movable supporting means supporting said second shaft means for moving the same and said second friction disc means relative to said first friction disc means for varying the transmission ratio between said first and second friction disc means; operating means for said movable supporting means; a first rotary gear; a second rotary gear having a greater diameter than said first rotary gear means; a third rotary gear intermediate said first and second gears and meshing with said first and second gears; gear means connecting said second shaft means with said third gear in any position of said movable supporting means; a third rotary shaft means; shiftable means movable between two positions for selectively connecting said third shaft means to said first and second gears, respectively, for rotation therewith in two different speed ranges and in opposite directions of rotation; and reversing means for reversing the direction of rotation of one shaft means of said first and third shaft means when said shiftable means moves between said positions thereof.

2. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a first rotary gear; a second rotary internal gear having a greater diameter than said first gear; rotary intermediate gear means meshing with said first and second gears; gear means connecting in any position of said movable supporting means said second shaft means with said intermediate gear means, the rotary speeds of said first and second gears being gradually variable in accordance with the position of said movable supporting means and with the relative position of said first and second friction disc means; a third shaft means; coupling means for selectively connecting said first and second gears to said third shaft means for rotating said third shaft means within two gradually variable speed ranges and in opposite directions of rotation; and reversing means for reversing the direction of one shaft means of said first and third shaft means when said coupling means is shifted.

3. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first and said second friction disc means for varying the transmission ratio between said first and second friction disc means; operating means for said movable supporting means; a first rotary gear; a second rotary internal gear having a greater diameter than said first gear; rotary intermediate gear means meshing with said first and second gears; gear means connecting in any position of said movable supporting means said second shaft means with said planetary gear means, the rotary speeds of said first and second gears being gradually variable in accordance with the position of said movable supporting means and with the relative position of said first and second friction disc means; a third shaft means arranged coaxial with said first shaft means; coupling means for selectively connecting said first and second gears to said third shaft means for rotating said third shaft means within two gradually variable speed ranges and in opposite directions of rotation; and reversing means for reversing the direction of one shaft means of said first and third shaft means when said coupling means is shifted.

4. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a third shaft means arranged coaxial with said first shaft means; a first gear turnably mounted on said third shaft means; a second internal gear turnably mounted for rotation about the axis of said third shaft means and having a greater diameter than said first sun gear; intermediate gear means meshing with said first and second gears; gear means connected to each of said shaft means for rotation therewith and meshing with said intermediate gear means in any position of said movable supporting means whereby said first and second gears rotate in two different speed ranges at rotary speeds which are gradually variable in accordance with the relative position of said first and second friction disc means; coupling means for selectively connecting said first and second gears to said third shaft means whereby said third shaft means rotates within two gradually variable speed ranges at gradually variable speeds in accordance with the position of said coupling means and in opposite directions of rotation; and reversing means for reversing the direction of one shaft means of said first and third shaft means when said coupling means is shifted.

5. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a first rotary gear; a second rotary gear having a greater diameter than said first sun gear; rotary intermediate gear means meshing with said first and second gears; a gear means connected to each of said second shaft means for rotation therewith and meshing with said intermediate gear means whereby said first and second gears rotate in opposite directions and at different gradually variable speeds; a third shaft means; a coupling means movable between two operative positions for selectively connecting said first and second gears, respectively, to said third shaft means so that the same rotates within two gradually variable speed ranges; drive motor means connected to one of said first and third shaft means for driving the same; reversing means for reversing the direction of rotation of said drive motor means; and control means connecting said coupling means with said reversing means and operating the same for reversing the direction of rotation of said drive motor means whenever said coupling means is moved to one of said operative positions so that the other of said first and third shaft means rotates in the same direction in said speed ranges regardless of the position of said coupling means.

6. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a first rotary gear; a second rotary gear having a greater diameter than said first gear; rotary intermediate gear means meshing with said first and second gears; a gear means connected to each of said second shaft means for rotation therewith and meshing with said intermediate gear means whereby said first and second sun gears rotate in opposite directions and at different gradually variable speeds; a third shaft means; a coupling means movable between two operative positions for selectively connecting said first and second gears, respectively, to said third shaft means so that the same rotates within two gradually variable speed ranges; drive motor means connected to said first shaft means for driving the same; reversing means for reversing the direction of rotation of said drive motor means; and control means operable between a plurality of positions and connecting said coupling means with said reversing means, said control means operating said reversing means in one of said positions thereof to reverse the direction of rotation of said drive motor whenever said coupling means is moved to one of said operative positions of the same so that said third shaft means rotates in said speed ranges in the same direction regardless of the position of said coupling means, said control means maintaining in another of said positions the direction of rotation of said drive motor means so that the direction of rotation of said third shaft means is reversed whenever said coupling means is moved to said one of said operative positions of the same.

7. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a first rotary gear; a second rotary internal gear having a greater diameter than said first sun gear; rotary intermediate gear means meshing with said first and second gears; a gear means connected to each of said second shaft means for rotation therewith and meshing with said intermediate gear means whereby said first and second gears rotate in opposite directions and at different gradually variable speeds; a third shaft means; a coupling means movable between two operative positions for selectively connecting said first and second gears, respectively, to said third shaft means so that the same rotates within two gradually variable speed ranges; electric drive motor means connected to one of said first and third shaft means for driving the same; reversing switch means for reversing the direction of rotation of said drive motor means; and control means connecting said coupling means with said reversing switch means and operating the same for reversing the direction of rotation of said electric drive motor means whenever said coupling means is moved to one of said operative positions so that the other of said first and third shaft means rotates in the same direction in said speed ranges regardless of the position of said coupling means.

8. A variable friction transmission as set forth in claim 7 wherein each sun gear of said first and second sun gears has a set of coupling teeth arranged in a circle, said sets of coupling teeth being spaced from each other in axial and radial directions; and wherein said coupling means includes a coupling portion having two radially spaced sets of coupling teeth for engaging said sets of coupling teeth of said first and second gear means, and is mounted on said third shaft means non-rotatable and shiftable in axial direction between said two operative positions, one of said spaced sets of coupling teeth engaging the set of coupling teeth on one of said first and second sun gears in each of said operative positions of said coupling means.

9. A variable friction transmission as set forth in claim 7 wherein said coupling means include shifting means movable between two operative positions corresponding to the operative positions of said coupling means, and wherein said control means are connected to said shifting means and operated by the same.

10. Variable friction transmission operable in two speed ranges comprising, in combination, first rotary shaft means; at least two second rotary shaft means arranged parallel to said first shaft means; first friction disc means connected to said first shaft means for rotation therewith; at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a first rotary gear; a second rotary gear having a greater diameter than said first sun gear; rotary intermediate gear means meshing with said first and second gears; a gear means connected to each of said second shaft means for rotation therewith and meshing with said intermediate gear means whereby said first and second gears rotate in opposite directions and at different gradually variable speeds; a third shaft means; a coupling means movable between two operative positions for selectively connecting said first and second gears, respectively, to said third shaft means so that the same rotates within two gradually variable speed ranges, said coupling means including manually operated operating means movable between two operative positions corresponding to the operative positions of said coupling means; drive motor means connected to said first shaft means for driving the same; reversing means for reversing the direction of rotation of said drive motor means; and control means connected to said manually operated operating means of said coupling means and being actuated by the same to move between a plurality of positions, said control means being connected to said reversing means and operating the same in one of said positions thereof to reverse the direction of rotation of said drive motor whenever said coupling means is moved to one of said operative positions of the same so that said third shaft means rotates in said speed ranges in the same direction regardless of the position of said coupling means, said control means maintaining in another of said positions the direction of rotation of said drive motor means so that the direction of rotation of said third shaft means is reversed whenever said coupling means is moved by said operating means to said one of said operative positions of the same.

11. Variable friction transmission operable in two ranges and comprising, in combination, first rotary shaft means; second rotary shaft means; first and second friction disc means connected, respectively, to said first and second shaft means for rotation therewith and meshing with each other; movable supporting means supporting said second shaft means for moving the same and said second friction disc means relative to said first friction disc means for varying the transmission ratio between said first and second friction disc means; operating means for said movable support means; a first rotary gear; a second rotary gear having a greater diameter than said first rotary gear; a third rotary gear intermediate said first and second rotary gears and meshing with said first and second gears; gear means connecting said second shaft means with said third gear in any position of said movable supporting means; a third rotary shaft means; shiftable means movable between two positions for selectively establishing a driving connection between said first gear and said third shaft means or between said second gear and said third shaft means for rotation of said third shaft means in two different speed ranges and in opposite directions of rotation; and means for reversing the direction of rotation of one shaft means of said first and third shaft means when said shiftable means moves between said positions thereof.

12. A variable friction transmission operable in two speed ranges and comprising, in combination, first rotary shaft means; at least two second rotary shaft means arranged parallel to said first shaft means; first friction disc means connected to said first shaft means for rotation therewith at least two second friction disc means, each second friction disc means being connected to one of said second shaft means for rotation therewith and meshing with said first friction disc means; movable supporting means supporting said second shaft means for moving the same and said second friction disc means relative to said first friction disc means for varying the transmission ratio between said first and second friction disc means; operating means for said movable supporting means; a first rotary gear; a second rotary internal gear having a greater diameter than said first gear; rotary intermediate gear means meshing with said first and second gears; gear means connecting in any position of said movable supporting means said second shaft means with said intermediate gear means; a third rotary shaft means; shiftable means movable between two positions for selectively establishing a driving connection between said first gear and said third shaft means or between said second gear and said third shaft means for rotation of said third shaft means in two different speed ranges and in opposite directions of rotation; and means for reversing the direction of rotation of one shaft means of said first and third shaft means when said shiftable means moves between said positions thereof.

References Cited in the file of this patent

UNITED STATES PATENTS

| | | |
|---|---|---|
| 1,560,982 | Fornaca | Nov. 10, 1925 |
| 2,222,281 | Beier | Nov. 19, 1940 |
| 2,253,750 | Beier | Aug. 26, 1941 |
| 2,343,333 | Sharpe | Mar. 7, 1944 |